(12) United States Patent
Derose

(10) Patent No.: US 9,716,783 B2
(45) Date of Patent: Jul. 25, 2017

(54) GERM BARRIER FOR A TELECOMMUNICATION DEVICE, AND METHOD OF USE THEREOF

(71) Applicant: Richard Derose, Dalton, MA (US)

(72) Inventor: Richard Derose, Dalton, MA (US)

(*) Notice: Subject to any disclaimer, the term of this patent is extended or adjusted under 35 U.S.C. 154(b) by 0 days.

(21) Appl. No.: 14/940,820

(22) Filed: Nov. 13, 2015

(65) Prior Publication Data
US 2016/0142525 A1    May 19, 2016

Related U.S. Application Data

(60) Provisional application No. 62/079,213, filed on Nov. 13, 2014.

(51) Int. Cl.
*H04M 1/17* (2006.01)
*H04B 1/3888* (2015.01)

(52) U.S. Cl.
CPC ............ *H04M 1/17* (2013.01); *H04B 1/3888* (2013.01)

(58) Field of Classification Search
CPC .................................. H04M 1/17; H04R 1/12
USPC .................................. 455/575.1, 575.8, 90.3
See application file for complete search history.

(56) References Cited

U.S. PATENT DOCUMENTS

| 8,454,901 B1* | 6/2013 | Snyder, III ................ A61L 2/07 422/26 |
| 2009/0060173 A1* | 3/2009 | Williams .................. H04R 1/12 379/452 |
| 2010/0102252 A1* | 4/2010 | Harmon .................... A61L 2/10 250/492.1 |

* cited by examiner

*Primary Examiner* — John J Lee
(74) *Attorney, Agent, or Firm* — Schmeiser, Olsen & Watts, LLP

(57) ABSTRACT

A germ protector for a telecommunications device comprising a body portion having at least one open end for receiving the telecommunications device, the body portion being flexible to conform to the telecommunications device; wherein at least a portion of an inner surface of the body portion is coated with a decontaminant.

14 Claims, 2 Drawing Sheets

GERM BARRIER FOR A TELECOMMUNICATION DEVICE, AND METHOD OF USE THEREOF

CROSS REFERENCE TO RELATED APPLICATIONS

This application claims priority to Application No. 62/079,213, having a filing date of Nov. 13, 2014, the content of which is hereby incorporated by reference to the extent that it is not inconsistent with the present disclosure.

FIELD OF TECHNOLOGY

The following relates to embodiments of a germ barrier for use with a telecommunications device, and methods of providing a germ barrier.

BACKGROUND

In many environments, telecommunications devices, such as telephones, are commonplace and may be shared between multiple people. Each time the telecommunications device is used, bacteria, viruses, other pathogens and/or other harmful particles may be collect on the surfaces of the telecommunications device, which can then be transmitted from one user to the next. Particularly concerning is that telecommunications devices are typically held by a user's hand and placed next to the user's mouth, nose, and ear allowing for easy transmission of contaminants. In many cases, a user may deposit contaminates onto a telecommunications device with a hand or by contacting the telecommunications device to his or her mouth, nose, or ear. Facial hair may exacerbate the deposition of contaminates onto a telecommunications device. The user may also deposit contaminates onto the telecommunications device when he or she exhales, speaks, sneezes, burps, coughs, or otherwise releases air and saliva from his or her mouth or nose during use of the telecommunications device. Alternatively, an individual with malicious intent may deposit contaminants onto the telecommunications device purposefully. Subsequent users of the telecommunications device are likely to be exposed to these contaminates. For example, contaminants may be deposited onto a subsequent user's hand or face during use. Additionally, a subsequent user may inhale contaminants during use.

Contaminants that may be deposited on a telecommunications device include bacteria, viruses, other pathogens and/or other harmful particles such as poisons or radioactive material. Contaminants that are susceptible of being transmitted through use of a telecommunications device include methicillin-resistant *staphylococcus aureus*, staph infections, Hepatitis C, other cold and flu like dieses, anthrax and ricin.

Telecommunications devices can transmit contaminants to users in almost any environment. Telecommunications devices in hospitals, medical/health care facilities, correctional facilities, Federal buildings, State buildings, Municipalities, Large facilities, and airports may transmit contaminants to users at an increased rate.

Thus, there is a need for an apparatus and method that addresses some or all of the above disadvantages.

SUMMARY

A first aspect relates generally to a germ protector for a telecommunications device comprising a body portion having at least one open portion for receiving the telecommunications device, the body portion being flexible to conform to the telecommunications device; wherein at least a portion of an inner surface of the body portion is coated with a decontaminant.

A second aspect relates generally to a method for preventing the spread of contaminants through a telecommunications device comprising: reaching a hand through an open portion of a flexible body; grabbing a telecommunications device with the flexible body; and pulling the telecommunications device substantially into the flexible body such that the outer surface of the flexible body becomes the inner surface of the flexible body.

A third aspect relates generally to a germ protector for a telecommunication device, the telecommunications device being located in a jail or prison, the telecommunications device being accessible by a number of guards or inmates, the telecommunications devices including an ear piece, mouth piece, handle and cord, comprising: a flexible body portion having at least one open portion and an inner surface; the flexible body portion configured to encompass the ear piece, mouth piece, and handle of the telecommunication device, the flexible body portion capable of substantially conforming to the handle of the telecommunications device; a first open portion of the at least one open portion configured to encircle the cord of the telecommunications device.

BRIEF DESCRIPTION OF THE DRAWINGS

Some of the embodiments will be described in detail, with reference to the following figures, wherein like designations denote like members, wherein.

DETAILED DESCRIPTION

While this disclosure contains many specific details, it should be understood that various changes and modifications may be made without departing from the scope of the technology herein described. The scope of the technology shall in no way be construed as being limited to the number of constituting components, the concentration of constituting components, the materials thereof, the shapes thereof, the relative arrangement thereof, the temperature employed, the order of combination of constituents thereof, etc., and are disclosed simply as examples. The depictions and schemes shown herein are intended for illustrative purposes and shall in no way be construed as being limiting in the number of constituting components, connectivity, reaction steps, the materials thereof, the shapes thereof, the relative arrangement thereof, the order of reaction steps thereof, etc., and are disclosed simply as an aid for understanding.

As a preface to the detailed description, it should be noted that, as used in this specification and the appended claims, the singular forms "a," "an" and "the" include plural referents, unless the context clearly dictates otherwise.

Figure 1A:
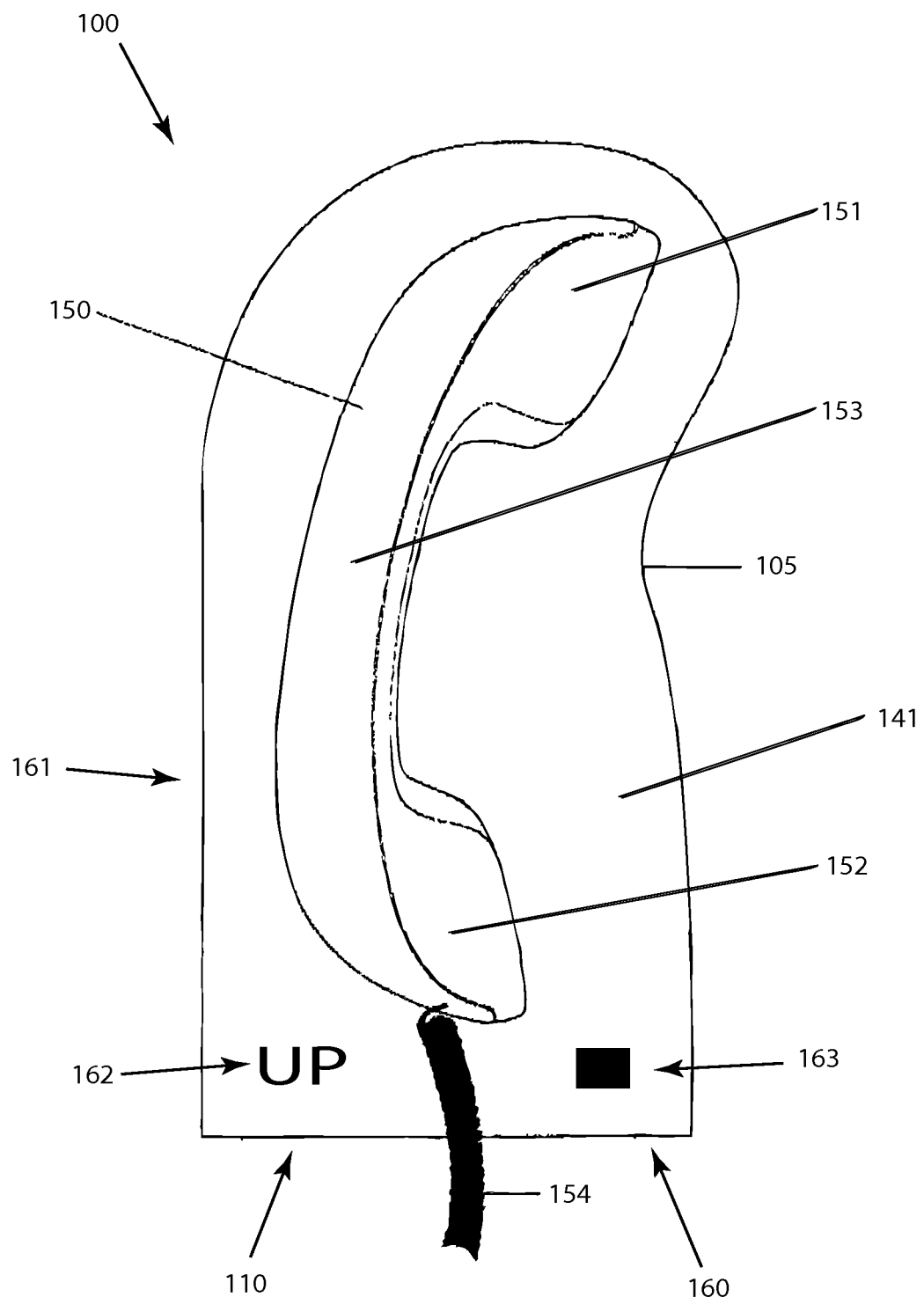
FIG. 1A depicts a side view of an embodiment of a guard.

Referring to the drawings, FIG. 1A depicts an embodiment of guard 100. Embodiments of a guard 100 may be a guard, a germ barrier, a cover, a reusable cover, a disposable liner, a liner, a slip, a barrier, a protector, and the like, or any device that is configured to surround or otherwise guard/protect a telecommunications device. Embodiments of guard 100 may include body portion 105 that can be configured to enclose, surround, cover, conform to, house, or otherwise protect a telecommunications device 150, such as a phone. Embodiments of the telecommunication device 150 may be a telephone, a shared phone, a public phone, a pay phone, an office phone, a portable phone, and the like. Embodiments of the telecommunications device 150 may include an ear piece 151, a mouth piece 152, and a handle portion 153; embodiments of the ear piece 151 and the mouth piece 152 may comprise or form part of the handle portion 153. Embodiments of body portion 105 may have an open portion 110. The open portion 110 may be configured to allow the telecommunications device 150 and potentially a portion of a cord 154 to pass therethrough and enter an interior of the guard 100. An inner surface 140 of body portion 105 may include a decontaminant. For example, the inner surface 140 may be coated, treated, soaked, and/or sprayed with a decontaminant. Where only inner surface 140 includes a decontaminant, body portion 105 may include an indication 162 as to which surface is the inner surface 140, which includes the decontaminant. With such an indication, a user of guard 100 can avoid contacting the decontaminant. In alternative embodiments, the outer surface 141 of the body portion 105, or both the inner surface 140 and the outer surface 141 of body portion 105 may include a decontaminant. In some embodiments, a decontaminant may be Oasis spray solution. In further embodiments, neither the inner surface nor the outer surface of body portion 105 have a decontaminant 140, and the surface of the guard 100 acts as the barrier to germs and/or hazardous material. In additional embodiments, the inner surface 140 includes a decontaminant and the outer surface 141 of body portion 105 includes a pleasant scent. In some embodiments, the presence of the pleasant scent can indicate that the guard 100 does not need to be changed, while the lack of the pleasant scent can indicate that the guard 100 needs to be changed.

Furthermore, guard 100 may be made as a single, unitary piece of material. For instance, embodiments of guard 100 may be constructed from any suitably flexible material, e.g., sheet vinyl, polyethylene, or any other suitable flexible material. In alternative embodiments, guard 100 is made from two or more pieces of flexible material that are affixed or adhered together to form body portion 105. For example, body portion 105 may be formed from two pieces of flexible material that are adhered together. In some embodiments, body portion 105 may be made from a material that is durable enough to be used as a barrier on a telecommunications device but fragile enough so that body portion 105 cannot be used to store or hide materials, such as contraband. This embodiment may be particularly useful in a prison or jail setting. In some embodiments, guard 100 may be rectangular and/or have one or more linear ends and/or edges. For example, guard 100 may include a linear end 160 and a linear edge 161. In alternative embodiments, guard 100 may be shaped to conform to a standard telephone receiver, or at least significantly or fully cover a standard telephone. For example, a portion of the body portion 105 of guard 100 that is configured to fit around handle 153 may have a smaller diameter than the portion of body portion 105 that is configured to fit around ear piece 151 and mouth piece 152. Such a configuration can minimize movement of body portion 105 over telecommunications device 150 during use. In alternative embodiments, body portion 105 may be curved or otherwise manipulated to conform to the handle 153, mouthpiece 152, and ear piece 151 when in use. Body portion 105 may or may not include any edges.

In some embodiments, guard 100 may be manufactured and sold for disposable use. In these embodiments, before use of a telecommunications device by a user, the user may apply a new guard 100 to the telecommunication device 150. When the user is finished using the device, the guard 100 can be removed and disposed of In some embodiments, guard 100 may be changed regularly after a specific amount of time has elapsed or after a certain number of uses. Alternatively, guard 100 may be replaced after each use. In an alternative embodiment, guard 100 may be replaced after a staff member assigned to a specific desk or location goes off-duty or is assigned to a new desk or location. In this embodiment, guard 100 may include an indication 163, such as a symbol or color, indicating that a particular guard is to be used by a specific person or group of people. Other guards 100 would include a different indication to indicate that that guard 100 was to be used by a different person or group of people. In further embodiments, the indication may be a pleasing or popular image or design. In this way, guard 100 on a telecommunications device would not have to be changed after each use, but would still operate to reduce the transmission of contaminants. In other words, embodiments of guard 100 may be disposable, reusable after decontamination, and the like. Guard 100 may be sold in packages containing multiple guards.

Figure 1B:
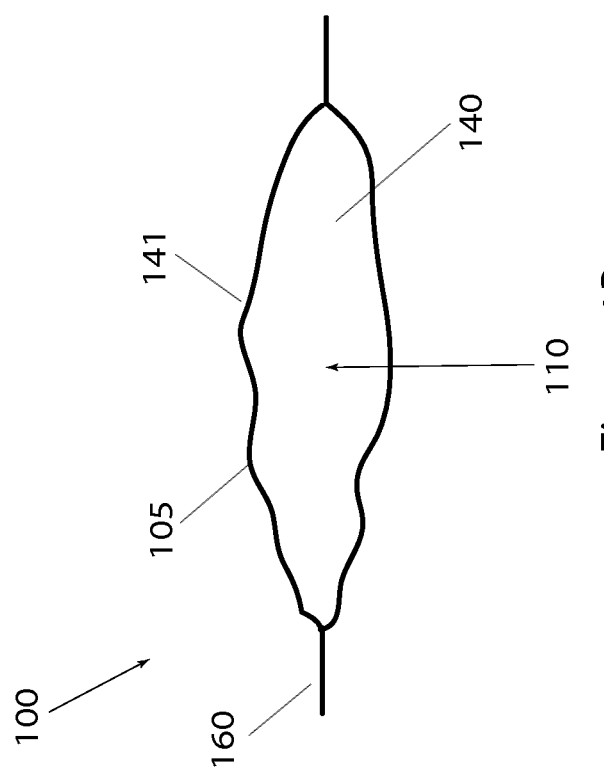
FIG. 1B depicts a back view of an embodiment of the guard.

FIG. 1B depicts a back view of an embodiment of guard 100, which includes an open portion 110. In some embodiments, open portion 110 may be configured such that telecommunications device 150 can fit therethrough. In further embodiments, open portion 110 may reside on linear end 160. In still further embodiments, open portion 110 may extend across an entire linear end 160 of body portion 105, or may extend across an entire linear end 160 and up adjacent linear edge 161 of body portion 105 making it easier to place the telecommunications device 150 therethrough. In further embodiments, body portion 105 may include more than one open portion 110. In alternative embodiments, open portion 110 may reside on a curved edge or on a surface of body portion 105.

Guard 100 may be dispensed such that it is easy for a user to place their hand through open portion 110, grab telecommunications device 150, and pull telecommunications device 150 back through open portion 110 such that guard 100 can be applied to telecommunications device 150 without the user having to make contact with telecommunications device 150. Decontaminant 140 could be placed accordingly. In alternative embodiments, the user of telecommunications device 150 may be wearing protective gloves, such as latex gloves. In these embodiments, the user of telecommunications device 150 applies guard 100 to telecommunications device 150 with his hands. In these embodiments, guard 100 prevents the transmission of containments to the user's face, nose, mouth and ears during operation of telecommunications device 150.

Referring to FIGS. 1A-1B, a method of providing a barrier to germs and/or hazardous materials for a telecommunications device may include the steps of retrieving a guard 100, and placing telecommunications device 150 therein. In some embodiments, telecommunications device 150 may be inserted into guard 150 through open portion 110. In alternative embodiments, guard 100 may be wrapped around telecommunications device 150 and sealed or affixed to form body portion 105.

In some embodiments, body portion 105 may include a filter portion to remove contaminants. In some embodiments with a filter portion, sound may be less distorted when traveling through guard 100. The filter portion may comprise one or more commercially available filters. The filter portion may be located at any location on body portion 105. In some embodiments, the filter portion will be placed on body portion 105 so as to cover ear piece 151 and/or mouth piece 152. The filter portions may be permanently placed in body portion 105 or may be removable from body portion 105. In some embodiments, filter portions may be replaceable thereby extending the life of guard 100.

The present invention is disclosed above by preferred embodiments. However, persons skilled in the art should understand that the preferred embodiments are illustrative of the present invention only, and should not be interpreted as restrictive of the scope of the present invention. Hence, all equivalent modification and replacements made to the aforesaid embodiments should fall within the scope of the present invention. Accordingly, the legal protection for the present invention should be defined by the appended claims.

The invention claimed is:

1. A germ protector for a telecommunications device comprising:
   a body portion having at least one open portion for receiving the telecommunications device, the body portion being flexible to conform to the telecommunications device;
   wherein at least a portion of an inner surface of the body portion is coated with a decontaminant, a first open portion of the at least one open portion residing on a first linear edge of the body portion;
   wherein the first open portion resides on a first linear end and a first linear edge of the body portion, the first linear edge being substantially perpendicular to the first linear end, the first open portion being continuous across the first linear end and the first linear edge.

2. The germ protector for a telecommunications device of claim 1, wherein the decontaminant kills germs.

3. The germ protector for a telecommunication device of claim 2, wherein the body portion includes an indicator to indicate the inner surface of the body portion with the decontaminant.

4. The germ protector for a telecommunications device of claim 1, wherein the body portion comprises a unitary piece.

5. The germ protector for a telecommunication device of claim 1, wherein the body portion is made from plastic.

6. The germ protector for a telecommunication device of claim 1, wherein the body portion comprises at least two pieces that are joined with an adhesive.

7. The germ protector for a telecommunication device of claim 1, wherein the body portion includes an indicator to distinguish the germ protector from other germ protectors.

8. The germ protector for a telecommunication device of claim 1, wherein the first linear edge is the only linear edge of the body portion.

9. The germ protector for a telecommunication device of claim 1, wherein the germ protector is disposable.

10. A method for preventing the spread of contaminants through a telecommunications device comprising:
    reaching a hand through an open portion of a flexible body;
    grabbing a telecommunications device with the flexible body; and
    pulling the telecommunications device substantially into the flexible body such that the outer surface of the flexible body becomes the inner surface of the flexible body;
    wherein at least a portion of an inner surface of the flexible body is coated with a decontaminant, a first open portion of the at least one open portion residing on a first linear edge of the flexible body;
    wherein the first open portion resides on a first linear end and a first linear edge of the flexible body, the first linear edge being substantially perpendicular to the first linear end, the first open portion being continuous across the first linear end and the first linear edge.

11. The method of claim 10 wherein the decontaminant kills germs.

12. A germ protector for a telecommunication device, the telecommunications device being located in a jail or prison, the telecommunications device being accessible by a number of guards or inmates, the telecommunications devices including an ear piece, mouth piece, handle and cord, comprising:
    a flexible body portion having at least one open portion and an inner surface;
    the flexible body portion configured to encompass the ear piece, mouth piece, and handle of the telecommunication device,
    the flexible body portion capable of substantially conforming to the handle of the telecommunications device;
    a first open portion of the at least one open portion configured to encircle the cord of the telecommunications device.

13. The telecommunications device of claim 12, wherein the inner surface includes a decontaminant.

14. The telecommunications device of claim 12, wherein the first open portion resides on a linear edge of the flexible body portion.

* * * * *